United States Patent
Kim et al.

(10) Patent No.: US 9,742,627 B2
(45) Date of Patent: Aug. 22, 2017

(54) SYSTEM FOR AUTOMATIC CONNECTION BETWEEN NVR AND IP CAMERA

(71) Applicant: IDIS CO., LTD., Daejeon-Si (KR)

(72) Inventors: Dae-Won Kim, Seoul (KR); Hyo-Jin Byeon, Seongnam-si (KR); Jun-Hyeok Heo, Seoul (KR)

(73) Assignee: IDIS CO., LTD., Daejeon-Si (KR)

( * ) Notice: Subject to any disclaimer, the term of this patent is extended or adjusted under 35 U.S.C. 154(b) by 650 days.

(21) Appl. No.: 13/925,881

(22) Filed: Jun. 25, 2013

(65) Prior Publication Data

US 2014/0379882 A1    Dec. 25, 2014

(51) Int. Cl.
G06F 15/16    (2006.01)
H04L 12/24    (2006.01)
H04L 29/08    (2006.01)

(52) U.S. Cl.
CPC ...... *H04L 41/0806* (2013.01); *H04L 41/0886* (2013.01); *H04L 67/125* (2013.01)

(58) Field of Classification Search
CPC  H04L 41/0806; H04L 41/0886; H04L 67/125
USPC ........................................ 709/222, 224, 223
See application file for complete search history.

(56) References Cited

U.S. PATENT DOCUMENTS

| | | | | |
|---|---|---|---|---|
| 2006/0279628 A1* | 12/2006 | Fleming | ............... | G11B 27/034 348/143 |
| 2008/0122920 A1* | 5/2008 | Chang | .................... | H04N 5/76 348/14.01 |
| 2009/0031381 A1 | 1/2009 | Cohen et al. | | |
| 2009/0096877 A1* | 4/2009 | Kunishige | ............... | G03B 17/14 348/207.11 |
| 2009/0219411 A1 | 9/2009 | Marman et al. | | |
| 2012/0113265 A1 | 5/2012 | Galvin | | |
| 2012/0331066 A1* | 12/2012 | FitzGerald | ............. | H04L 67/24 709/206 |
| 2015/0103179 A1* | 4/2015 | Galvin | ................. | H04N 5/247 348/159 |

FOREIGN PATENT DOCUMENTS

| | | |
|---|---|---|
| KR | 10-2010-0129736 | 12/2010 |
| KR | 10-2011-0039023 | 4/2011 |
| KR | 10-2012-0033845 | 4/2012 |

OTHER PUBLICATIONS

European Search Report issued Nov. 7, 2013 in counterpart European Patent Application No. 1317390.6-1905 (7 pages).

(Continued)

*Primary Examiner* — Bryan Lee
*Assistant Examiner* — Oluwatosin Gidado

(57) ABSTRACT

A system of a network video recorder (NVR) device for automatic connection to an IP camera is provided. The system is implemented to make it possible to automatically establish a connection between the NVR device and the IP camera while reducing a user's intervention, and thereby a user not having enough expertise knowledge of IP network settings may be able to avoid experiencing inconvenience in manual settings, and also it is possible to prevent errors which may occur in manually adjusting the network settings and to prevent unnecessary time wasted on the network setting management process.

12 Claims, 4 Drawing Sheets

(56) References Cited

OTHER PUBLICATIONS

Anonymous: "Zero-configuration networking—Wikipedia, the free encyclopedia" May 29, 2013 XP055085974, Retrieved from the internet: URL:http://en.wikipedia.org/w/index.php?title=Zero-configuration_networking&oldid=557295731 ( 6pages).
Guttman, Erik. "Autoconfiguration for IP Networking: Enabling local communication." *Internet Computing, IEEE* 5.3 (2001): pp. 81-86.

\* cited by examiner

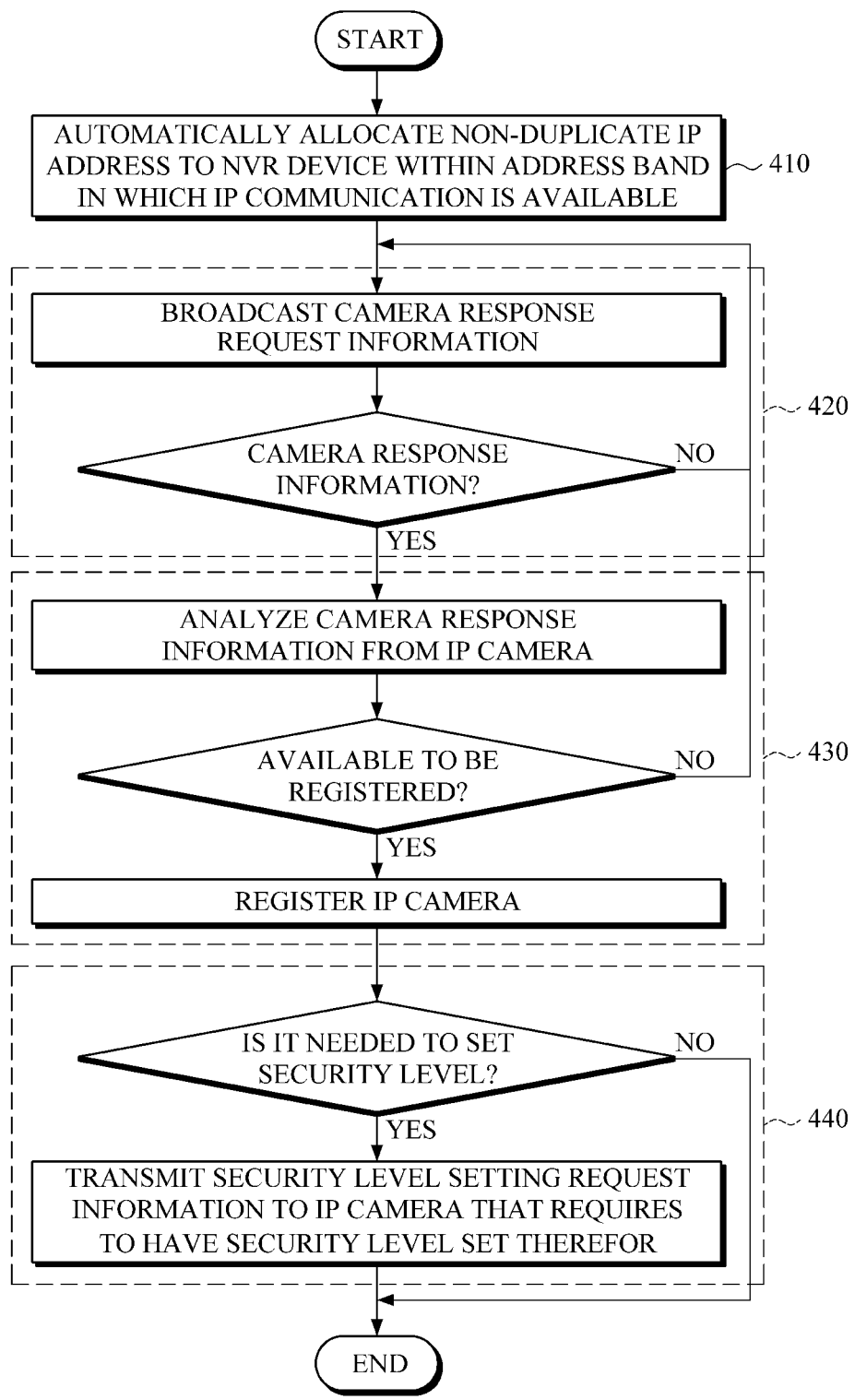

SYSTEM FOR AUTOMATIC CONNECTION BETWEEN NVR AND IP CAMERA

BACKGROUND

1. Field

The following description relates to Internet protocol (IP) camera automatic connection settings, and more particularly, to a system of a network video recorder (NVR) device for automatic connection to an IP camera.

2. Description of the Related Art

For IP connection to a remote Internet protocol (IP) camera and registration of the connected IP camera, a network video recorder (NVR) Needs to first set up a network, and settings for this setup process may include an IP address of the NVR, a gateway address, a subnet mask, a domain name server address, and the like.

Once the network settings of the NVR is finished, then the network settings of the IP camera should be performed, which is generally not possible to be done solely with the IP camera, but with a specific application installed in a separate personal computer (PC) to make the settings of the IP camera, such as an IP address of the IP camera, a gateway address, a subnet mask and a domain name server address.

Korean Patent Publication No. 10-2012-0033845 (published on Apr. 9, 2012) relates to settings of an NVR for port forwarding. However, to set up a network between the NVR and an IP camera, expertise knowledge about IP network settings is required. Therefore, a general user who does not have enough skilled knowledge of the IP network settings may have difficulties in manually managing the network settings of the NVR and the IP camera.

Hence, there is an increasing need for a technology to automatically establish a connection between an NVR device and an IP camera while reducing a user's intervention.

PRIOR ART REFERENCE

Patent Document (Patent Document 1) Korean Patent Publication No. 10-2012-0033845 (Apr. 9, 2012)

SUMMARY

The following description relates to a system of a network video recorder (NVR) device for automatic connection to an IP camera, which is capable of automatically establishing a connection between the NVR device and the IP camera, with a reduced user's intervention.

In one general aspect, there is provided a system of a network video recorder (NVR) device for automatic connection to an Internet protocol (IP) camera, the system including: an IP configuration unit configured to automatically allocate to the NVR device a non-duplicate IP address within a valid IP address range; a camera searching unit configured to broadcast to an IP camera on an local area network (LAN) camera response request information having as a destination the IP address automatically allocated to the NVR device and to identify the IP camera in response to receiving camera response information transmitted from the IP camera; a camera managing unit configured to analyze the camera response information from the IP camera identified by the camera searching unit to determine whether the IP camera is available to be registered and to, if the IP camera is determined as available, register the IP camera; and a communication unit configured to transmit the camera response request information and receive the camera response information.

Other features and aspects will be apparent from the following detailed description, the drawings, and the claims.

BRIEF DESCRIPTION OF THE DRAWINGS

FIG. 4 is a flowchart of a method of registering an IP camera in a system of an NVR device for automatic connection according to an exemplary embodiment of the present invention.

Figure 1:
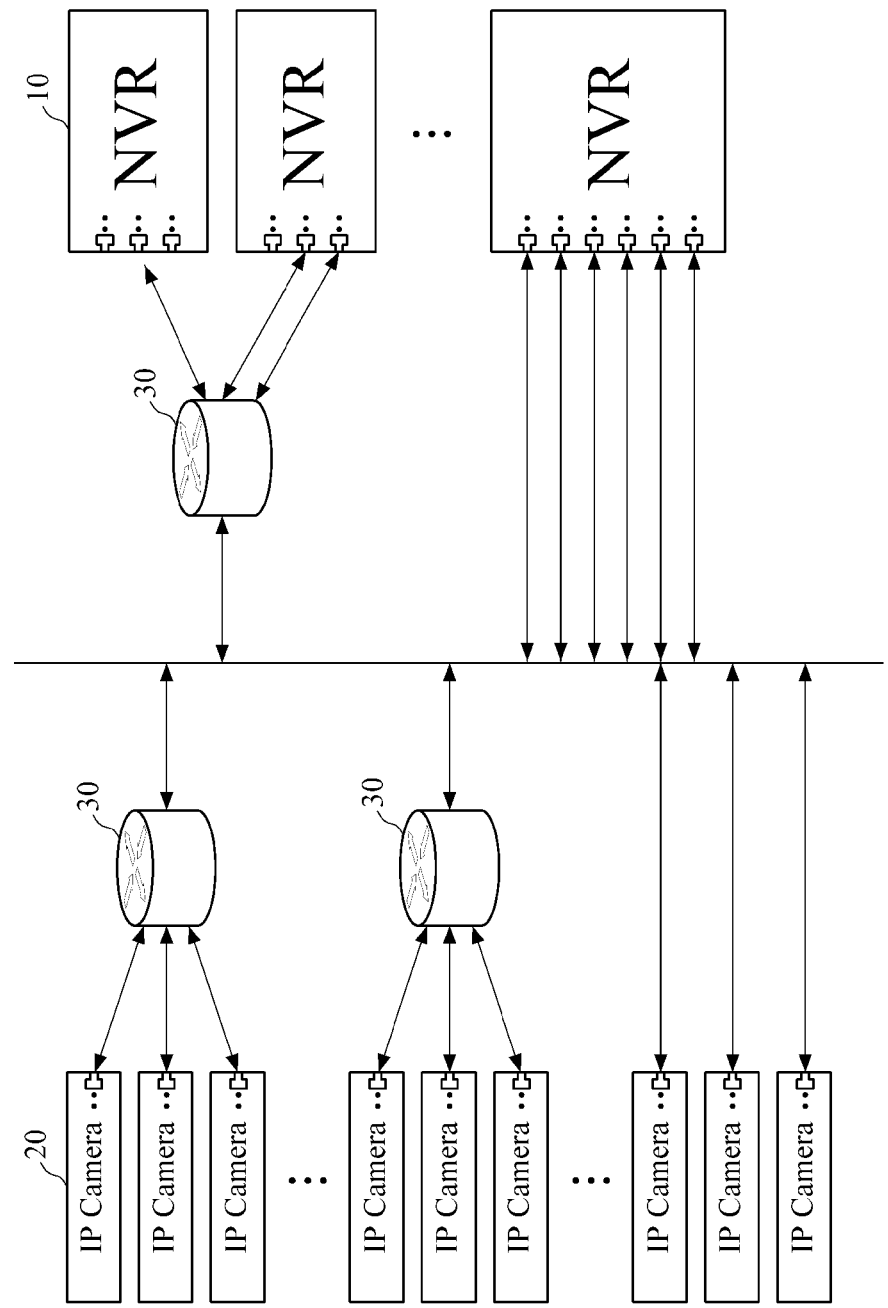
FIG. 1 is a diagram illustrating a network connection of a system for automatic connection between a network video recording (NVR) device and an Internet protocol (IP) camera.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a network connection of a system for automatic connection between a network video recording (NVR) device and an Internet protocol (IP) camera. Referring to FIG. 1, a local area network (LAN) is formed by at least one NVR device 10 connected with at least one IP camera 20 directly or via a router 30.

The NVR device 10 may include a system 100 for automatic connection to an IP camera. The system may broadcast request information to the IP cameras on the LAN, wherein the request information includes an IP address of the NVR device 10 as a destination of a response from the IP camera. In addition, the system may analyze response information transmitted from the IP camera 20 in response to the request information and register the IP camera by determining whether the IP camera is available to be registered.

Figure 2:
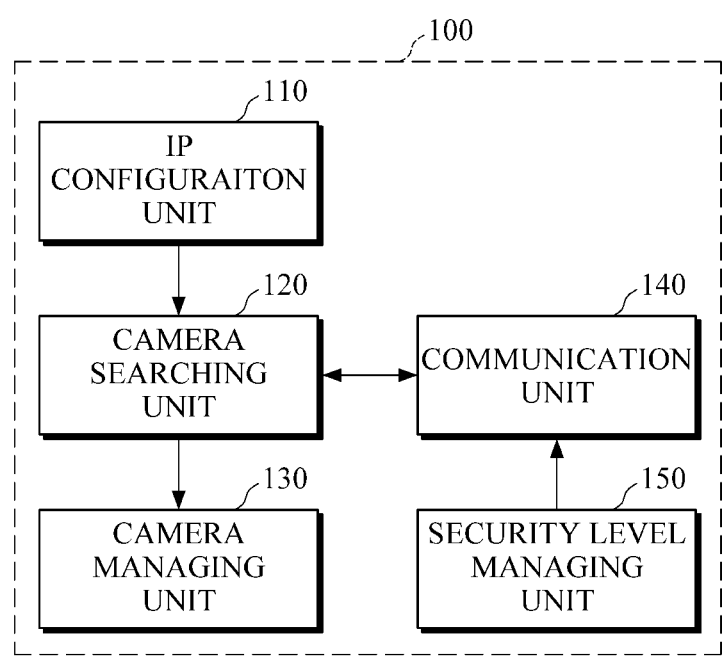
FIG. 2 is a block diagram illustrating a system of an NVR device for automatic connection to an IP camera according to an exemplary embodiment of the present invention.

FIG. 2 is a block diagram illustrating a system of an NVR device for automatic connection to an IP camera according to an exemplary embodiment of the present invention. As shown in FIG. 2, the system 100 for automatic connection between the NVR device and IP camera may include an IP configuration unit 110, a camera searching unit 120, a camera management unit 130, and a communication unit 140.

The IP configuration unit 110 automatically allocates to the NVR device a non-duplicate IP address within a valid IP address range. For example, the IP configuration unit 110 may automatically allocate an IP address to the NVR device 10 using a zero-configuration scheme that enables automatic settings of an IP network.

The camera searching unit 120 may broadcast to the IP camera 20 on the LAN camera response request information having as its destination the IP address automatically allocated to the NVR device 10 by the IP configuration unit 110, and identify an IP camera transmitting response information in response to the camera response request information.

For example, the camera searching unit 120 may broadcast camera response request information to the IP camera 20 using a zero-configuration networking protocol so as to instruct the IP camera 20 on the LAN to inform its camera registration state.

The camera managing unit 130 may determine whether the IP camera 20 is available to be registered by analyzing the response information from the IP camera 20 that is identified by the camera searching unit 120, and if the IP camera 20 is determined as being available, register the IP camera 20. Here, IP camera registration information may include an IP address, a gateway address, a subnet mask and a domain name server address of the IP camera.

For example, the camera managing unit 130 may analyze camera registration state information written to a specific region of the zero-configuration networking protocol transmitted as the camera response information from the IP camera 20 and determine whether the IP camera 20 is available to be registered.

The specific region of the zero-configuration networking protocol to which the camera registration state information is written is an additional region that is defined by zero-configuration networking protocol standards.

For example, the camera registration state information may include first information for identifying whether the IP camera has been registered or not, second information for identifying whether the IP camera accesses an NVR device or not, and third information including a media access control (MAC) address of an NVR that has registered therein the IP camera.

The camera managing unit 130 may register the IP camera when the analysis result of the first information of the camera registration state information indicates that the IP camera has not been yet registered. Meanwhile, the camera managing unit 130 may analyze the second information when the analysis result of the first information indicates that the IP camera has been registered, and if the analysis result of the second information indicates that the IP camera is not in access to an NVR, the camera managing unit 130 may register the IP camera. In addition, if the first information indicate that an IP camera has been registered and the second information indicates that the IP camera is in access to an NVR, the camera managing unit 130 may identify which NVR has registered therein the IP camera, based on the MAC address included in the third information.

Once the camera managing unit 130 registers the IP camera 20, an image captured by the IP camera 10 is transmitted to and stored in the NVR device 20 that has registered the IP camera 20.

The communication unit 140 may transmit camera response request information and receive camera response information. Through the communication unit 140, the camera response request information is broadcasted from the camera searching unit 120 to the IP camera 20 and the camera response information is received from the IP camera 20 in response to the camera response request information.

Accordingly, it is feasible to establish automatic connection between the NVR device and the IP camera while reducing user's intervention, and hence a user without expert knowledge about IP network settings does not have to manually adjust network settings for the NVR device and the IP camera, and it is possible to prevent probable errors in settings which may occur during manual setting process and to prevent unnecessary time spent on setting up a network between the NVR device and the IP camera.

In another aspect, the camera managing unit 130 may provide a user interface to enable the user to register an image capturing location at which the IP camera captures an image in response to the determination being made that the IP camera 20 is available to be registered.

In this case, if there are a number of IP cameras determined as available to be registered, a user interface with a display screen divided into segments may be provided, such that the image capturing locations of each IP camera can be registered in the respective screen segments.

In the meantime, when it is determined that there are more than a given number of IP cameras available to be registered, the camera managing unit 130 may provide a user interface with a display screen divided on a page basis.

In addition, the camera managing unit 130 may arrange the screen segments of the user interface according to the order of physical network ports of the NVR device connected with the number of IP cameras.

In this case, the camera managing unit 130 may recognize the physical network ports of the NVR device connected with the IP cameras, and each screen segment of the user interface may display the image output from each of the IP cameras.

As a result, the user only needs to select a screen position at which each image from the IP cameras is output while watching the images transmitted from the IP cameras, and thereby it is possible to establish automatic connection between the NVR device and the IP camera while reducing the user's intervention.

Accordingly, the user who does not have expert knowledge about the IP network settings does not have to experience inconvenience in manually adjusting the network settings for the connection between the NVR device and the IP camera, and also it is possible to prevent errors which may occur in manual settings and to prevent unnecessary time wasted on the network settings.

In additional aspect, the system 100 may further include a security level managing unit 150. The security level managing unit 150 may control a security level of the registered IP camera.

For example, the security level managing unit 150 may transmit security level setting request information to an IP camera 20 which is not to be exposed to another NVR device, so as to request the IP camera 20 to set its security level for not responding to camera response request information broadcast from the other NVR device.

For example, in response to receiving the security level setting request information broadcast from the NVR device, the IP camera 20 does not transmit camera response information to the other NVR device, thereby preventing itself from being exposed to the other NVR device.

In additional aspect, when an IP camera is disconnected while having its security level set so as not to respond to camera response request information broadcast from another NVR device, the camera managing unit 130 may initialize the IP camera settings, thereby allowing the IP camera to be available to other NVR devices.

In additional aspect, when finding an IP camera available to be registered, the camera managing unit 130 may notify the user of the IP camera. For example, the camera managing unit 130 may use a sound to notify the user of a found IP camera that is available to be registered.

Figure 3:
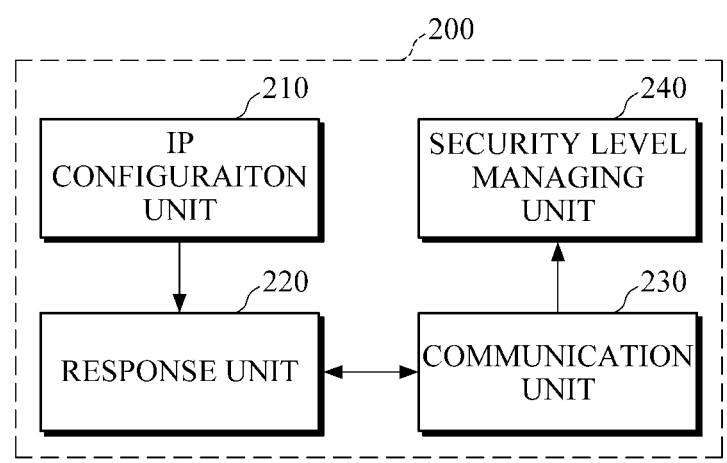
FIG. 3 is a block diagram illustrating a configuration of a client device mounted in an IP camera to automatically connect the IP camera to an NVR device.

FIG. 3 is a block diagram illustrating a configuration of a client device mounted in an IP camera to automatically connect the IP camera to an NVR device. As shown in FIG. 3, the client device 200 to automatically connect the IP camera to the IP camera may include an IP configuration unit 210, a response unit 220, and a communication unit 230.

The IP configuration unit 210 may automatically allocate to the IP camera 20 a non-duplicate IP address within a valid IP address range. For example, the IP configuration unit 210 may automatically allocate to the IP camera 20 an IP address using a zero configuration scheme that enables automatic settings of an IP network.

In response to receiving camera response request information broadcast from the NVR device 10 and having as a destination an IP address of the NVR device, the response unit 220 may transmit camera response information to the IP address of the NVR device 10.

For example, the response unit 220 may write, as the camera response information, camera registration state information to a specific region of a zero-configuration networking protocol, and transmit the zero-configuration networking protocol to the NVR device 10.

In this case, the specific region of the zero-configuration networking protocol to which the camera registration state information is written is an additional region specified by zero-configuration networking protocol standards.

For example, the camera registration state information may include first information for identifying whether the IP camera has been registered or not, second information for identifying whether the IP camera accesses an NVR device or not, and third information including a MAC address of an NVR that has registered therein the IP camera.

The communication unit 230 may receive the camera response request information from the NVR device 10, and transmit camera response information to the NVR device 10 in response to the camera response request information. The communication unit 230 enables the transmission/reception of information with the NVR device 10.

In additional aspect, the client device 200 may further include a security level setting unit 240. The security level setting unit 240 may receive security level setting request information from the NVR device 10 and update a security level of the IP camera in response to the received security level setting request information.

For example, in response to the security level setting request information broadcast from the NVR device to request the IP camera to set its security level so as not to respond to camera response request information broadcast from another NVR device, the security level setting unit 240 may set the security level of the IP camera so as not to respond to the camera response request information broadcast from the other NVR device.

IP camera registration procedures of a system of an NVR device for automatic connection to an IP camera will be described with reference to FIG. 4. FIG. 4 is a flowchart of a method of registering an IP camera in a system of an NVR device for automatic connection according to an exemplary embodiment of the present invention.

In 410, the system of the NVR device automatically allocates to the NVR device a non-duplicate IP address within a valid IP address range. The automatic allocation of the IP address to the NVR device is described above, and thus detailed description will not be reiterated.

Upon allocating the IP address to the NVR device, the system broadcasts camera response request information having as a destination the IP address of the NVR device to an IP camera present on an LAN and receives camera response information from the IP camera in response to the camera response request information in 420.

Upon receiving the camera response information from the IP camera, the system of the NVR device analyzes the camera response information to determine whether the IP camera is available to be registered, and if the IP camera is determined as available, registers the IP camera in 430. The registration of the IP camera is described above, and thus the detailed description thereof will not be reiterated.

If the IP camera registered in 430 is required to have its security level set, the system transmits security level setting request information to the IP camera in 440.

Then, in response to the security level setting request information, the IP camera updates the level security. For example, the security level setting request may request the IP camera to set its security level so as not to respond to camera response request information broadcast from another NVR device.

Accordingly, it is possible to automatically establish a connection between the NVR device and the IP camera while reducing the user's intervention, and hence a user who does not have enough expertise knowledge about IP network settings may be able to avoid experiencing inconvenience in manually adjusting network settings and also it is possible to prevent errors which may occur in manual settings and to prevent unnecessary time wasted on the network setting management process.

The embodiments of the present invention may be applicable to various fields, such as IP camera automatic setting fields and the application fields of the IP camera automatic settings.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network video recorder (NVR) apparatus for automatic connection to an Internet protocol (IP) camera, the NVR apparatus comprising:
   an IP configuration unit, implemented by a processor, configured to automatically allocate to the NVR apparatus a non-duplicate IP address within a valid IP address range;
   a camera searching unit, implemented by the processor, configured to broadcast to an IP camera on a local area network (LAN) camera response request information having as a destination the IP address automatically allocated to the NVR apparatus and to identify the IP camera in response to receiving camera response information transmitted from the IP camera;
   a camera managing unit, implemented by the processor, configured to analyze the camera response information from the IP camera identified by the camera searching unit to determine whether the IP camera is available to be registered and, in response to determining the IP camera being available, to register the IP camera;
   a communication unit, implemented by the processor, configured to transmit the camera response request information and receive the camera response information; and a security level managing unit configured to control a security level of a registered IP camera, wherein the security level managing unit transmits security level setting request information to an IP camera, which is not to be exposed to another NVR apparatus, to request the IP camera to set a security level of the IP camera for not responding to camera response request information broadcast from the other NVR apparatus, wherein the camera managing unit is further configured to provide a user interface to allow registration of an image capturing location at which the IP camera captures an image in response to a determination that the IP camera is available to be registered, and register the image capturing location through the user interface, and wherein the camera managing unit is further configured to, in response to a determination that there are a number of IP cameras available to be registered, provide a user with the user interface having a display screen divided into segments, and register image capturing locations of each IP camera to respective ones of the segments of the display screen of the user interface.

2. The NVR apparatus of claim 1, wherein the IP configuration unit automatically allocates the IP address to the NVR apparatus using a zero configuration scheme that enables automatic settings of an IP network.

3. The NVR apparatus of claim 2, wherein the camera searching unit broadcasts to the IP camera on the LAN the camera response request information using a zero-configuration network protocol to request the IP camera to report a camera registration state.

4. The NVR apparatus of claim 3, wherein the camera managing unit analyzes the camera registration state information written to a specific region of the zero-configuration network protocol transmitted as the camera response information from the IP camera so as to determine whether the IP camera is available to be registered.

5. The NVR apparatus of claim 4, wherein the camera registration state information includes first information for identifying whether the IP camera has been registered or not, second information for identifying whether a registered IP camera is in access to an NVR apparatus or not, and third information including a media access control (MAC) address of an NVR apparatus that has registered therein the IP camera.

6. The NVR apparatus of claim 5, wherein the camera managing unit analyzes the first information of the camera registration state information and, in response to the analysis result indicating that the IP camera has not been registered, registers the IP camera.

7. The NVR apparatus of claim 5, wherein in response to an analysis result of the first information of the camera registration information indicating that the IP camera has been registered, the camera managing unit analyzes the second information, and in response to the analysis result of the second information indicating that the IP camera is not in access to the NVR apparatus, registers the IP camera and identifies the NVR apparatus that has registered therein the IP camera, based on the MAC address included in the third information.

8. The NVR apparatus of claim 1, wherein in response to determining that there are more than a predefined number of IP cameras available to be registered, the camera managing unit provides the user with a user interface with a display screen divided on a page basis.

9. The NVR apparatus of claim 1, wherein the camera managing unit arranges the screen segments of the user interface according to an order of physical network ports of the NVR device connected with the number of IP cameras.

10. The NVR apparatus of claim 9, wherein the camera managing unit recognizes the physical network ports of the NVR device connected with the IP cameras, and displays the images captured by the IP cameras in the respective screen segments of the user interface.

11. The NVR apparatus of claim 1, wherein in response to finding an IP camera available to be registered, the camera managing unit notifies the user of the found IP camera.

12. The NVR apparatus of claim 1, wherein in response to an IP camera being disconnected while having the security level of the IP camera set so as not to respond to camera response request information broadcast from another NVR apparatus, the camera managing unit initializes the IP camera settings in order to allow the IP camera to be available to other NVR apparatuses.

* * * * *